July 9, 1963     I. PAGE     3,097,285

THERMOSTAT-TIMER DEVICE

Filed Sept. 30, 1960     2 Sheets-Sheet 1

Inventor
IRVING PAGE

By
Raymond R. Skolnick
Agent

July 9, 1963 I. PAGE 3,097,285
THERMOSTAT-TIMER DEVICE
Filed Sept. 30, 1960 2 Sheets-Sheet 2
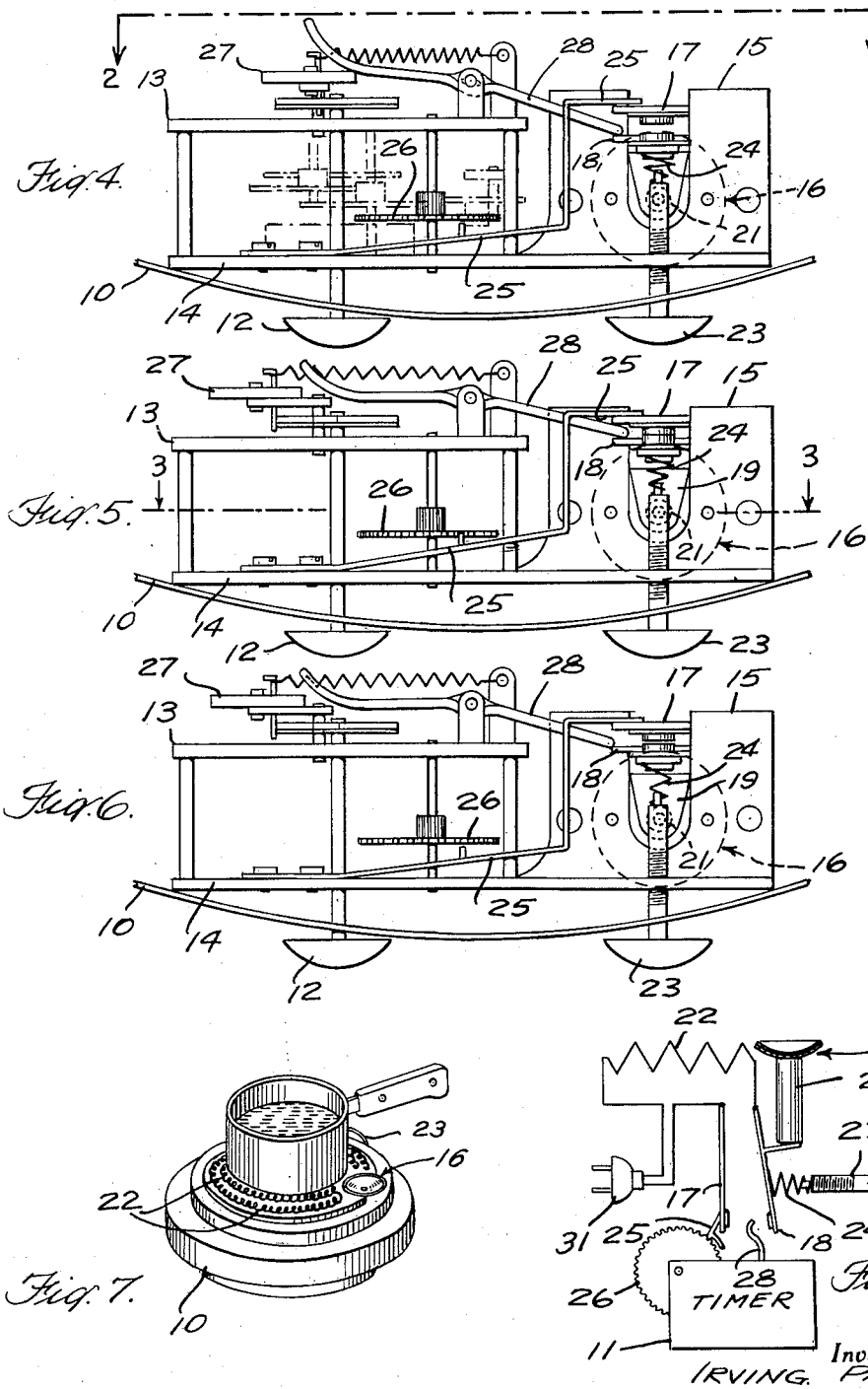
Inventor
IRVING PAGE
By Raymond R. Skolnick
Agent 3,097,285
Patented July 9, 1963

3,097,285
THERMOSTAT-TIMER DEVICE
Irving Page, Brooklyn, N.Y.; Esther Page, administratrix of Irving Page, deceased, assignor of one-fourth to Warren Page, one-fourth to Esther Page, and one-fourth to Roberta Page, all of New York County, N.Y., and one-fourth to Rhoda Page, Queens County, N.Y.
Filed Sept. 30, 1960, Ser. No. 59,621
5 Claims. (Cl. 219—20)

This invention relates in general to timing devices and more particularly to timing devices used for cooking purposes where thermostatic means are employed for starting the timing cycle.

Heretofore, timing devices used for cooking have been of the type where the heating cycle controlled by a thermostat and the timing of the heating cycle were done simultaneously. The timing started as soon as the heat was applied and therefore the preheat cycle was included in the overall heating period. In cooking operations as well as other types of heating controls it is very important as well as necessary to control the period after a certain temperature has been reached rather than the overall period of when the heat has been applied.

It is therefore an object of this invention to provide an improved means for controlling a heating cycle after the preheat period.

Another object of this invention is to provide a device for timing a heating cycle after the preheat period.

A still further object of this invention is to provide an improved means for controlling and timing a heating cycle, after the preheat period, which is small, compact, cheap to manufacture and easily maintained.

To these ends the invention contemplates the use of a dished heat sensitive bimetallic element, a mechanical timing device, a pair of breaker points and a heating coil.

The breaker points are adjusted so as to be biased to a given temperature setting. One of the breaker points is controlled by the bimetallic element through a glass rod. The other breaker hontrols the starting of a mechanical timing device. The dished heat sensitive bimetallic element is placed in a position where it makes contact with a cooking utensil or any other element which is being heated and desired to be controlled. The heat sensitive element through the glass rod connected thereto makes and breaks the contacting of the breaker points which in turn makes and breaks the current through a heating element. Upon the heated element reaching its desired temperature the breaker point controlling the timing device releases the timing device so that it can time the period after the preheat cycle.

While the mechanical timer is operating the breaker points will make and break contact under the control of the heat sensitive element thereby maintaining a controlled heat range. After the period of time, which the timer has been set for, has expired the timer will break the contact of the breaker points thereby shutting off the current to the heater element.

In this manner the heating period is controlled only after the desired heat has been reached and does not concern itself with the preheat period where the heated element is being heated so as to come up to temperature. In many cooking operations as well as other types of heating operations the really important period during which the heating should be controlled and maintained is after the heated element comes up to temperature. To these ends the inventor conceived the novel device outlined above and which is hereinafter more fully disclosed.

The invention has other objects and advantages which will appear from the following description of a particular embodiment of the invention in conjunction with the accompanying drawings, in which:

FIG. 4 is a bottom view of the heating and timing control mechanism, with the cover removed, showing the mechanism in its off position;

FIG. 5 is a bottom view of the heating and timing control mechanism, similar to FIG. 4, showing the mechanism after the timer has been set but before the breaker points have released the timer mechanism;

FIG. 6 is a bottom view of the heating and timing control mechanism, similar to FIGS. 4 and 5, showing the mechanism with the heater on and the timer mechanism released;

FIG. 7 is a perspective view of the invention showing the invention with a cooking utensil in position for being heated and controlled; and FIG. 8 is a schematic view of the circuitry of the invention.

Figure 1:
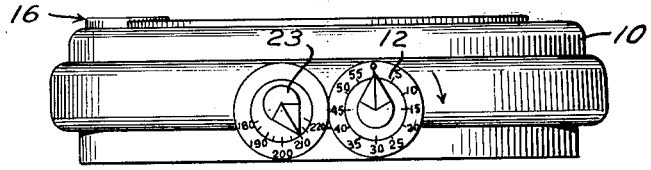
FIG. 1 is a front view, in elevation, of the invention showing the heat and timing control knobs.

With reference to the drawings the particular embodiment shown there of the invention comprises, in general, a cover or housing 10 within which is housed a mechanical timing mechanism 11. The timing mechanism has a knob 12 which is used to set the time for which the timer is desired to operate. The mechanical timing mechanism 11 is of the well-known type of clock timing mechanism having a spring, gearing, and escapement mechanism which are held between two plates 13 and 14. Attached to the plate 14 and perpendicular thereto is a top plate 15 which holds a heat sensitive dished bimetallic element 16 and a pair of breaker points 17 and 18.

A bracket 19 is connected to the breaker point 18 so as to capture a glass rod 21 between itself and the bimetallic element 16. The heat sensitive bimetallic element 16 is normally in a dished position and tends to flatten out upon being subjected to heat. The breaker point 18 is made of a spring material and is prestressed whereby it pushes the bracket 19 against the glass rod 21. In this manner as the dished element 16 starts to flatten out the breaker point 18 can move away from the breaker point 17. As shown in FIG. 8 the breaker point 18 is connected to one end of a heating coil 22 and the other breaker point 17 is connected to one side of a plug 31. The other side of the plug is connected to the other end of the heating coil 22. With the plug 31 connected to a source of electric current and the breaker points 17 and 18 contacting each other the electric circuit is completed and the current will flow in the heating coil 22.

To adjust the temperature setting of the breaker points a temperature setting adjusting screw 23 is provided which biases a spring 24, into engagement with the breaker point 18. The more the spring 24 is compressed by the screw 23 the higher the temperature of the heated element has to become before the breaker point 18 can move away from the breaker point 17 and thereby break contact disconnecting the electric circuit through the heating coil 22.

Connected to the plate 14 is a pawl arm 25. The pawl arm locks the drive gear 26 whenever the breaker point 17 is held in a stressed position by the breaker point 18 pushing against it.

Figure 2:
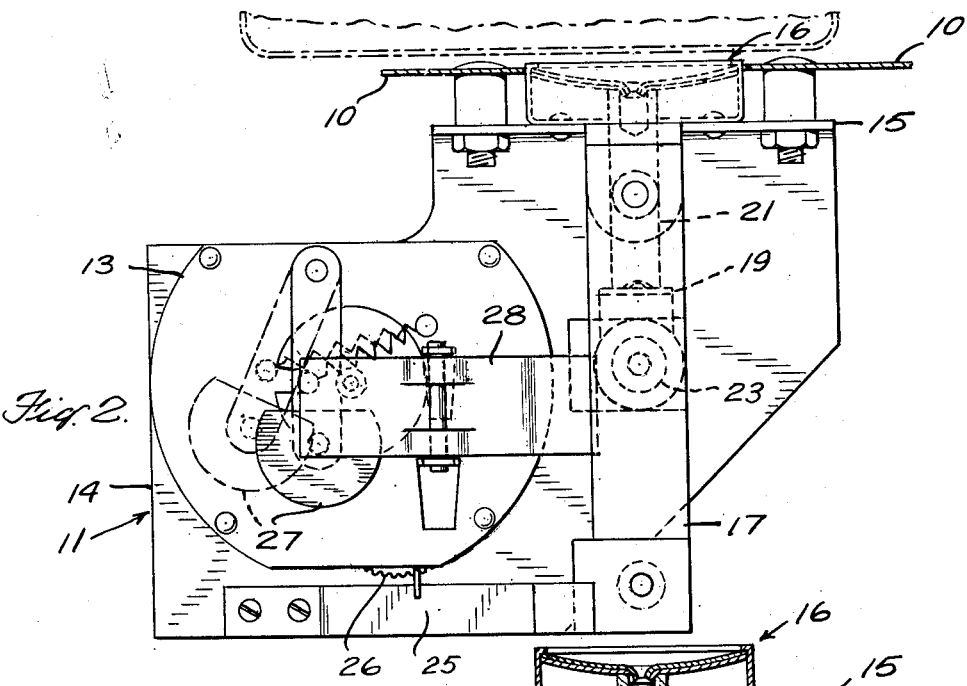
FIG. 2 is a vertical view of the heating and timing control mechanism with the cover removed taken along line 2—2 of FIG. 4.
Figure 3:
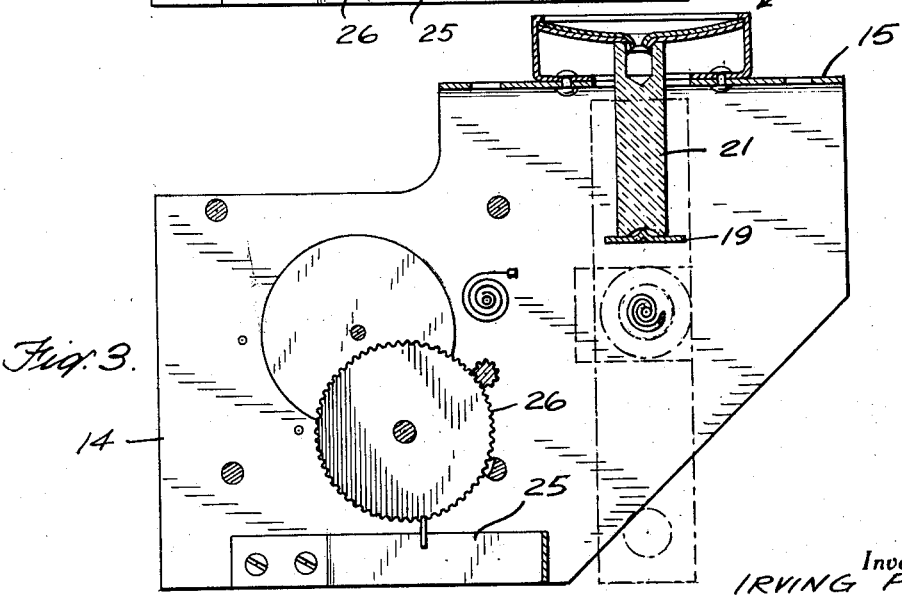
FIG. 3 is a sectional view of the invention taken along line 3—3 of FIG. 5.

At the rear of the timing mechanism 11 is a cam 27 (as shown in FIG. 2) which is in the off position. The dotted line indicates the cam's movement when in the on position. FIGS. 4, 5 and 6 more clearly indicate the movements of the cam 27 from the off to the on position of the timer. A switch lever 28 is moved by the cam 27 so as to push the breaker points apart or to allow them whenever the conditions are right to contact each other.

In FIG. 4 the timer is in its off position and the switch lever 28 is holding the breaker points 17 and 18 apart. Since the points are apart the pawl arm 25 does not engage the drive gear 26. With the breaker points apart the heating coil 22 is also off and no heat is being generated.

In FIG. 5 the timing mechanism 11 has been turned on. In the on position the cam 27 has moved out of the way of the switch lever 28 so that the switch lever 28 no longer exerts a force against the breaker point 18. Therefore, the breaker point 18 can contact breaker point 17. The amount of pressure exerted by the breaker point 18 against the breaker point 17 is determined by the biasing of the spring 24 by the adjusting screw 23. Breaker point 17 pushes against the pawl arm 25 bringing it into engagement with the drive gear 26 and locks it so that the timing mechanism even though it is in its on position cannot operate. With the breaker points making contact the electric circuit is completed and the heating coil 22 is supplying heat.

In FIG. 6 the temperature of the heated element has risen to the desired temperature and the bimetallic element 16 has flattened out allowing the breaker point 18 to move away from the breaker point 17. The breaker point 17 moves to its original position relieving the pressure it was exerting against the pawl arm 25. The pawl arm moves out of engagement with the drive gear 26 and allows it to start turning. The timing mechanism 11 will now operate for the length of time that it was initially set for.

When the time that the timer was set for has expired the cam 27 returns to its off position and pushes the switch lever 28 so as to break the contact of the breaker points. This breaks the current through the heating coil 22 and prevents any more heat from being generated.

The operation of the invention will now be explained to indicate how the parts enumerated above operate together to perform a useful function in a new and novel manner.

A cooking utensil or other object that is desired to be heated to a certain temperature and maintained at that temperature within a specific temperature range for a definite period of time is placed in contact with the heating coil 22. The cooking utensil by being placed in contact with the heating coil also contacts the dished bimetallic element 16 thereby allowing the bimetallic element to sense the temperature of the cooking utensil.

The temperature setting screw 23 is now adjusted to the desired temperature. The higher the desired temperature the more the screw has to bias the biasing spring 24 against the breaker point 18. The breaker point 18 is prestressed or loaded so as to exert a force against the biasing spring 18 and by its bracket 19 keeps the glass rod 21 captured between the bracket 19 and the bimetallic element 16. In this fashion the movement of the heat sensitive bimetallic element 16 allows the breaker point 18 to move away from the breaker point 17 as the temperature increases and moves the breaker point 18 towards the breaker point 17 upon the temperature decreasing.

The timing mechanism 11 is now set for the desired time by its timing knob 12. The turning of the knob 12 not only sets the time that the timing mechanism can operate but also releases the cam 27 from exerting pressure against the switch lever 28. The switch lever 28 being released no longer holds the breaker points apart and breaker point 18 moves so as to contact the breaker point 17. When the breaker points contact each other and the plug 31 is connected to a source of current the circuit is completed so that the heating coil 22 starts to generate heat.

The breaker point 18 by contacting breaker point 17 not only completes the electrical circuit but pushes breaker point 17 sufficient to force the breaker point 17 into pushing against the pawl arm 25. The pawl arm in turn engages one of the teeth of the drive gear 26 so that the timing mechanism 11 is prevented from operating.

As the heating coil 22 heats the cooking utensil the heat sensitive bimetallic element senses the temperature of the utensil. The hotter the utensil gets the flatter the bimetallic element becomes. When the temperature of the cooking utensil reaches the desired temperature the bimetallic element 16 has flattened sufficiently so that the glass rod 21 no longer is pushing against the bracket 19. The breaker point 18 due to its preloaded condition can now move away from the breaker point 17. The circuit through the heating coil 22 is broken and the heat being generated by the coil is shut off. In addition to the breaking of the circuit the movement of the breaker point 18 allows the breaker point 17 to move away from the pawl arm 25 so that the pawl arm can release the drive gear 26. The release of the drive gear 26 starts the timer 11 operating. The timer will now operate continuously for whatever time it was initially set for.

As the temperature of the cooking utensil drops the bimetallic element once more starts to become dished. As it becomes dished in shape it pushes against the glass rod 21 which in turn pushes against the bracket 19. The action of the glass rod against the bracket pushes the breaker point 18 into contact with the breaker point 17. This closes the circuit through the heating coil 22 and once again heat is generated by the coil. During this procedure the breaker point 18 only contacts the breaker point 17 sufficiently to make contact but not enough to force the breaker point 17 against the pawl arm 25. Therefore, although the electrical circuit is complete and heat is being generated by the heating coil 22 the timer 11 is still operating. In the above manner the heating cycle is maintained for the length of time that the timer has been set for.

When the timer 11 reaches the end of its time cycle the cam 27 moves into its off position which is under the switch lever 28. In this position the cam moves the switch lever 28 so that the lever separates the breaker points and prevents them from contacting each other. The electrical circuit is broken and only by resetting the timer can the circuit once more become activated.

The typical operation disclosed above indicates the simplicity and novelty of the invention in controlling a heating cycle from the moment heat is introduced and more particularly for the period after the heated object has reached its desired temperature.

Although I have described particular embodiments of the invention, it is understood that the present disclosure has been made by way of example and that numerous changes in the details of construction and the combination and arrangement of parts may be resorted to without departing from the spirit and the scope of the invention as hereinafter claimed.

What is claimed is:

1. A thermostat timer device comprising, a heating coil, a source of electric current connected across said heating coil, a heat sensing element, a pair of movable breaker points interposed between said current source and said heating coil, one of said breaker points being controlled by said heat sensing element, a timing means which is started by the other of said breaker points and a means for separating said breaker points upon the completion of the timing cycle.

2. A thermostat timer device comprising, a heating coil, a source of electric current connected across said heating coil, a heat sensing element, a pair of movable breaker points interposed between said current source and said heating coil, one of said breaker points being controlled by said heat sensing element, a timing means, a pawl which is controlled by the other of said breaker points for starting said timing means, a lever interposed between said breaker points and a cam connected to said timing means and positioned so as to control said lever whereby upon said timing means cycle ending said cam moves said lever so as to separate said breaker points.

3. A thermostat timer device comprising, a housing, a heating coil fastened to the top of said housing, a source of electric current connected across said heating coil, a dished bimetallic element connected to the top of said housing in close proximity to said heating coil, a pair of movable breaker points interposed between said current source and said heating coil, a bracket attached to one of said breaker points, a glass rod connected between said bimetallic element and said bracket whereby said bimetallic element upon moving controls said bracketed breaker point, a mechanical timer having a means for setting a particular timing cycle and a driving gear, a pawl connected to said timer which is controlled by the unbracketed breaker point for moving said pawl into and out of engagement with said driving gear, a lever connected to said timer having one end interposed between said breaker points and a cam connected to said timer and positioned so as to be under the other end of said lever, said cam moving said lever so as to separate said breaker points upon said timing cycle coming to an end.

4. A thermostat timer device comprising, a heating coil, a source of electric current connected across said heating coil, a heat sensing element, a pair of movable breaker points interposed between said current source and said heating coil, one of said breaker points being controlled by said heat sensing element, an adjusting means connected to the breaker point which is controlled by the heat sensing element for biasing said breaker point to various temperatures, a timing means, a pawl which is controlled by the other of said breaker points for starting said timing means, a lever interposed between said breaker points and a cam connected to said timing means and positioned so as to control said lever whereby upon said timing means cycle ending said cam moves said lever so as to separate said breaker points.

5. A thermostat timer device comprising, a heating coil, a source of electric current connected across said heating coil, a dished bimetallic element having a glass rod connected thereto, a pair of movable breaker points interposed between said current source and said heating coil, one of said breaker points being controlled by said bimetallic eelment, an adjusting means connected to the breaker point which is controlled by the bimetallic element for biasing said breaker point to various temperatures, a timing means, a pawl which is controlled by the other of said breaker points for starting said timing means, a lever interposed between said breaker points and a cam connected to said timing means and positioned so as to control said lever whereby upon said timing means cycle ending said cam moves said lever so as to separate said breaker points.

References Cited in the file of this patent
UNITED STATES PATENTS

| | | |
|---|---|---|
| 1,702,480 | Newsom | Feb. 19, 1929 |
| 2,715,672 | Barlow | Aug. 16, 1955 |
| 2,906,846 | Witherspoon | Sept. 29, 1959 |
| 3,043,936 | Page | July 10, 1962 |